(12) United States Patent
Baker et al.

(10) Patent No.: US 6,355,123 B1
(45) Date of Patent: Mar. 12, 2002

(54) ROLL-OVER AIR BAG HAVING A REINFORCED PERIMETER SEAL AND ASSOCIATED METHOD FOR PRODUCING A FLAT REINFORCED SEAL IN A ROLL-OVER AIR BAG

(75) Inventors: Robert A. Baker; Robert S. Baker, both of Dandridge, TN (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/405,339

(22) Filed: Sep. 24, 1999

Related U.S. Application Data (63) Continuation-in-part of application No. 09/110,632, filed on Jul. 6, 1998, now Pat. No. 6,113,141.

(51) Int. Cl.[7] .......................... B32B 31/20; B29C 65/04
(52) U.S. Cl. ................... 156/90; 156/274.4; 156/275.1; 156/289; 156/308.4; 280/743.1
(58) Field of Search ............................... 156/90, 273.7, 156/274.4, 274.8, 275.1, 275.3, 289, 308.2, 308.4; 280/730.2, 743.1

(56) References Cited

U.S. PATENT DOCUMENTS

| | | |
|---|---|---|
| 3,425,712 A | 2/1969 | Berryman |
| 3,807,754 A | 4/1974 | Rodenbach et al. |
| 3,879,056 A | 4/1975 | Kawashima et al. |
| 3,897,961 A | 8/1975 | Leising et al. |
| 3,960,386 A | 6/1976 | Wallsten |
| 3,970,328 A | 7/1976 | Wallsten |
| 4,010,005 A | 3/1977 | Morisaki et al. |
| 4,963,412 A | 10/1990 | Kokeguchi |
| 5,114,180 A | 5/1992 | Kami et al. |
| 5,427,410 A | 6/1995 | Shiota et al. |
| 5,452,914 A | 9/1995 | Hirai |
| 5,501,259 A | 3/1996 | Palm |
| 5,505,485 A | 4/1996 | Breed |
| 5,524,926 A | 6/1996 | Hirai et al. |
| 5,529,332 A | 6/1996 | Wipasuramonton |
| 5,529,340 A | 6/1996 | Fairbanks |
| 5,540,460 A | 7/1996 | Wipasuramonton |
| 5,582,429 A | 12/1996 | Heinz et al. |
| 5,615,914 A | 4/1997 | Galbraith et al. |
| 5,618,595 A | 4/1997 | Matsushima et al. |
| 5,630,620 A | 5/1997 | Hirai et al. |
| 5,871,230 A | 2/1999 | Lewis |
| 5,909,895 A | 6/1999 | Iino et al. |
| 6,015,471 A * | 1/2000 | Rimington et al. ...... 156/274.4 |
| 6,059,311 A * | 5/2000 | Wipasuramonton et al. ..... 280/729 |

FOREIGN PATENT DOCUMENTS

| | | |
|---|---|---|
| CA | 2059639 | 12/1991 |
| DE | 2552815 | 11/1975 |
| EP | 485599 A1 | 12/1991 |
| GB | 2243119 | 10/1991 |
| GB | 2252983 | 8/1992 |
| JP | 2-31965 | 2/1990 |
| JP | 2-237837 | 2/1990 |
| JP | 9000695 | 12/1991 |
| JP | 9118760 | 12/1991 |
| JP | 4-266544 | 4/1992 |
| JP | 4-356249 | 12/1992 |
| JP | 5-16751 | 1/1993 |

\* cited by examiner

*Primary Examiner*—Michael A. Tolin
(74) *Attorney, Agent, or Firm*—Blank Rome, LLP (57) ABSTRACT

A roll-over airbag 10 having an upper fabric panel 15 and a lower fabric panel 20 perimetrically bonded to the upper fabric panel 15. This perimetric joint is reinforced with a lap joint 30 defining a reinforced interior seal. The height and/or thickness of the roll-over airbag 10 can be limited by either selecting a configuration that is self limiting or by limiting the displacement of the upper and lower fabric panels 15 and 20 from one another during expansion of the roll-over airbag 10 by at least one tether member 40 disposed within roll-over airbag 10. Further, a method for producing a flat joint seam in a roll-over airbag in which the lap joint is sealed flat and steps are taken to prevent the upper and lower portions of the lap joint from adhering to one another.

1 Claim, 11 Drawing Sheets

ROLL-OVER AIR BAG HAVING A REINFORCED PERIMETER SEAL AND ASSOCIATED METHOD FOR PRODUCING A FLAT REINFORCED SEAL IN A ROLL-OVER AIR BAG

CROSS-REFERENCE TO RELATED APPLICATIONS

This is a continuation-in-part of application Ser. No. 09/110,632, filed on Jul. 6, 1998, now U.S. Pat. No. 6,113,141.

STATEMENT REGARDING FEDERALLY SPONSORED RESEARCH OR DEVELOPMENT

Not Applicable

BACKGROUND OF THE INVENTION

1. Field of Invention

This invention relates to the field of automotive restraints. More particularly, it relates to a self-inflating restraint for protecting occupants of an automobile in the event of a vehicle roll-over.

2. Description of the Related Art

It is known in the art to protect the occupants of a vehicle with an inflated restraint commonly referred to as an airbag. The airbag is in fluid communication with an inflator, which when activated, rapidly inflates the airbag with an inflation fluid. Airbags have been in use for a number of years to protect the front occupants of a vehicle from impacting the steering wheel, dash and/or the windshield during a front impact incident. And, airbags have recently been utilized to protect the occupants striking the side of the vehicle during side-impact and/or roll-over episodes. Those skilled in the art recognize that a major distinction between a roll-over air bag and a frontal or side impact air bag is that the frontal or side impact air bags are designed for extremely rapid deflation immediately following inflation. Contrariwise, a roll-over airbag, due to the nature of a roll-over incident, must maintain air pressure for a pre-determined amount of time in order to provide adequate protection to the vehicle occupant(s) during the roll-over episode. This sustained period of inflation under pressure requires a reinforced perimeter not found on typical frontal or side impact airbags. It will be appreciated that roll-over airbags, often referred to as "curtains", and side-impact airbags are typically stored, either in the seat, in the side pillar, or proximate the conjunction of the headliner and the side panel of the vehicle in a deflated, and often folded, condition. For example, U.S. Pat. No. 5,529,332 issued to Wipasuramonton on Jun. 25, 1996, and U.S. Pat. No. 5,540,460 issued to Wipasuramonton on Jul. 30, 1996, each disclose a side-impact airbag which is inflatable into a position between a vehicle occupant and the side structure of a vehicle.

U.S. Pat. No. 5,909,895, issued to lino, et al. discloses a thermoplastic resin film bag. The background art section describes a conventional airbag having a reinforced joint face and teaches that the reinforcing cloth is a cylindrical body that is three-dimensionally arranged to a two dimensional join face in which production is troublesome and in which, if joined two-dimensionally, creates a problem with wrinkling the joint face.

What has heretofore been missing from the art is a roll-over self-inflating airbag that has a reinforced perimeter seal that is capable of sustaining the requisite pressure of the airbag for a predetermined period of time, and that is configured to limit the displacement of the sides from one another during expansion. What has also been missing from the art is a method of producing a reinforced joint, or seam, that can be sealed flat, without a problem of wrinkling the joint face, while still providing adequate reinforcement of the sealed edge.

Accordingly, it is an object of the present invention to provide a roll-over airbag that has perimetrically reinforced sealed edges.

Another object of the present invention is to provide a roll-over airbag that is configured so as to limit the displacement of the sides from one another during expansion of the airbag.

Still another object of the present invention is to provide a roll-over airbag that has a series of internal, reinforced tethers for limiting the displacement of the sides from one another during expansion of the airbag.

A further object is to provide a method for providing a sealed flat reinforcing lap joint along the sealed edges.

Other objects and advantages over the prior art will become apparent to those skilled in the art upon reading the detailed description together with the drawings as described as follows.

BRIEF SUMMARY OF THE INVENTION

In accordance with the various features of this invention, a roll-over airbag is provided. The roll-over airbag of the present invention is defined by an inflatable air bag constructed of an upper fabric panel having a perimeter of a pre-selected length and a lower fabric panel perimetrically bonded to the upper fabric panel. In the preferred embodiment, this joint is reinforced with a lap joint so as to distribute the stress of rapid inflation over a larger surface area of the fabric and thereby transform an otherwise tear stress into a shear stress. In the preferred embodiment, the fabric material is a woven nylon, or other supported fabric, in which the interior has been treated with a urethane coating or other thermoplastic material that is reactive to high frequency energy, in order to be impermeable to the inflation fluid. During manufacturing, the lap joint and the perimetric edges are sealed flat by means of radio frequency (RF) bonding. At least one port opening is provided in the upper fabric panel for connecting the roll-over bag to an inflator to allow communication of the expansion fluid from the inflator to the roll-over airbag. Further, in accordance with the present invention, the process of bonding the lap joint prevents the lap joint from bonding to itself. In this regard, the lap joint is variously constructed of a material that prevents the bonding agent from bleeding through, constructed of a material having an impermeable agent adhered thereto, or has a template sandwiched between the upper and lower portions of the lap joint during the sealing process.

In addition to having perimeter reinforced inner seals, the roll-over airbag is constructed so as to limit the displacement of the upper and lower fabric panels from one another during inflation. In one embodiment, this is accomplished with at least one tether disposed within the airbag. Alternatively, the shape of the airbag and its perimetric contours can be selected for limiting displacement of the upper and lower fabric panels from one another. With the former, the tether has a first end bonded to the upper fabric panel and a second end bonded to the lower fabric panel. The length of the tether is preselected in order to determine the thickness and/or height of the expanded roll-over airbag. It will be appreciated by those skilled in the art that, in limited applications, it may be necessary to accommodate passage of a seat belt through the roll-over airbag, in such instances a passageway, having an expandable through opening, is disposed in the roll-over airbag.

BRIEF DESCRIPTION OF THE SEVERAL VIEWS OF THE DRAWINGS

The above-mentioned features of the invention will become more clearly understood from the following detailed description of the invention read together with the drawings in which:

FIGS. 9a–c illustrate top plan views of further alternate embodiments of the tether utilized in the present invention, in which the tethers are low profile tethers.

FIG. 10 illustrates a cross-sectional view of the tether illustrated in FIG. 9a, taken along line 10—10 in FIG. 9a.

FIG. 11 illustrates a partial cross-sectional view of the tether illustrated in FIG. 9a, installed in an alternate embodiment roll-over airbag.

DETAILED DESCRIPTION OF THE INVENTION

A roll-over airbag, constructed in accordance with the present invention, is illustrated generally as 10 in the figures. The roll-over airbag 10 is defined by an inflatable airbag 12 constructed of an upper fabric panel 15 having a perimeter 18 of a pre-selected length and a lower fabric panel 20 perimetrically bonded to the upper fabric panel 15. It should be understood that reference to upper and lower panels is simply for clarity of description and is not intended to limit the spatial orientation of the roll-over airbag 10. In the preferred embodiment, both the upper and lower fabric panels 15 and 20, respectively, are a woven nylon, or other supported fabric, in which the interior has been treated, often with a urethane coating, or coating of a similar thermoplastic that is reactive to high frequency, or radio frequency (RF), energy, in order to be impermeable to the inflation fluid. However, other materials could be utilized so long as the result is an inflation fluid impermeable material. At least one port opening 25 is provided in the upper fabric panel 15 for connecting the roll-over bag 10 to an inflator (not shown) to allow communication of the expansion fluid (not shown) from the inflator to the roll-over airbag 10.

Figure 14:
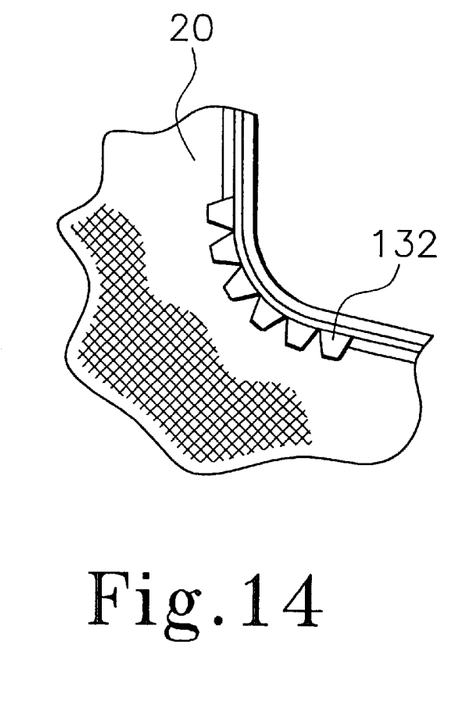
FIG. 14 illustrates a top plan view of a preferred method of forming an internal radius lap joint.
Figure 15:
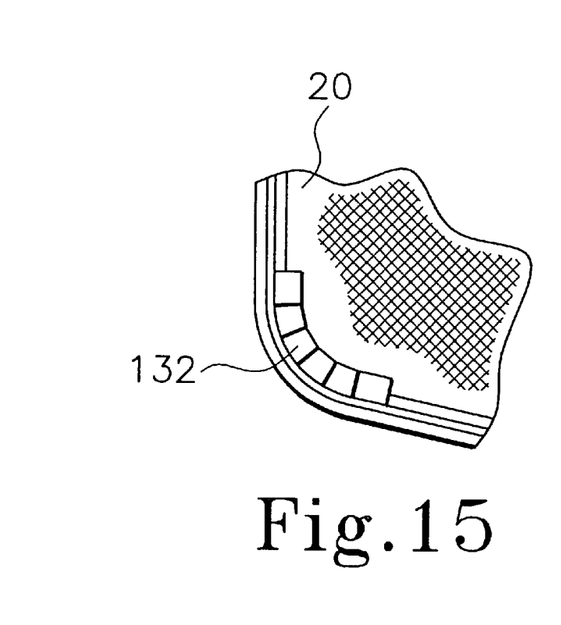
FIG. 15 illustrates a partial top plan view, showing the bottom panel of the roll-over airbag, of a preferred method of forming an external radius lap joint.
Figure 16:
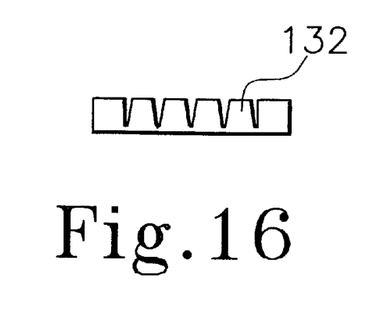
FIG. 16 illustrates a partial top plan view, showing the bottom panel of the roll-over airbag, of a notched portion of the reinforcing member for forming an internal or external radius.

As mentioned above, the perimeter edges 18 and 22, respectively, of the upper and lower fabric panels 15 and 20 are bonded together. In the preferred embodiment, the upper and lower fabric panels 15 and 20 are secured, preferably, by a RF weld or alternatively, an ultrasonic or thermal weld. Thus, it will be appreciated that the coating agent is preferably reactive to RF energy in order to effect bonding. However, the upper and lower fabric panels 15 and 20 can also be secured by means of an adhesive which has a high degree of thermal stability. It will be recognized by those skilled in the art that the time for inflating and thus, expanding roll-over airbag 10 is measured in milliseconds, and that, as a result, a large amount of tear stress is placed upon the state of the art joint, or seal. Moreover, a roll-over airbag must sustain this pressure for a longer period of time than the state of the art frontal or side impact airbag, which, by design, deflates rapidly immediately following inflation. In order to reinforce this joint, a lap joint 30 is utilized using an additional piece of fabric in order to distribute the stress over a larger surface area of the upper and lower fabric panels 15 and 20 and thereby transform the tear stress into a shear stress. In this regard, at least one securement member 32 is disposed proximate the perimeter seal such that the upper portion 34 of the securement member 32 is bonded to the upper fabric panel 15 and the lower portion 36 of the securement member 32 is bonded to the lower fabric panel 20. Tests have shown that this reinforced perimeter seal is capable of sustaining pressure for an extended period of time. FIG. 16 illustrates a segment 132 that is notched so as to form either an internal radius, illustrated in FIG. 14, or an external radius, illustrated in FIG. 15. In either configuration, if additional reinforcement is necessary, an additional curved segment (not shown) can be bonded over the portion of the segment 132 that is bonded to the upper fabric panel 15 and an additional curved segment (not shown), can be bonded over the portion of the segment 132 is bonded to the lower fabric panel 20.

Figure 1:
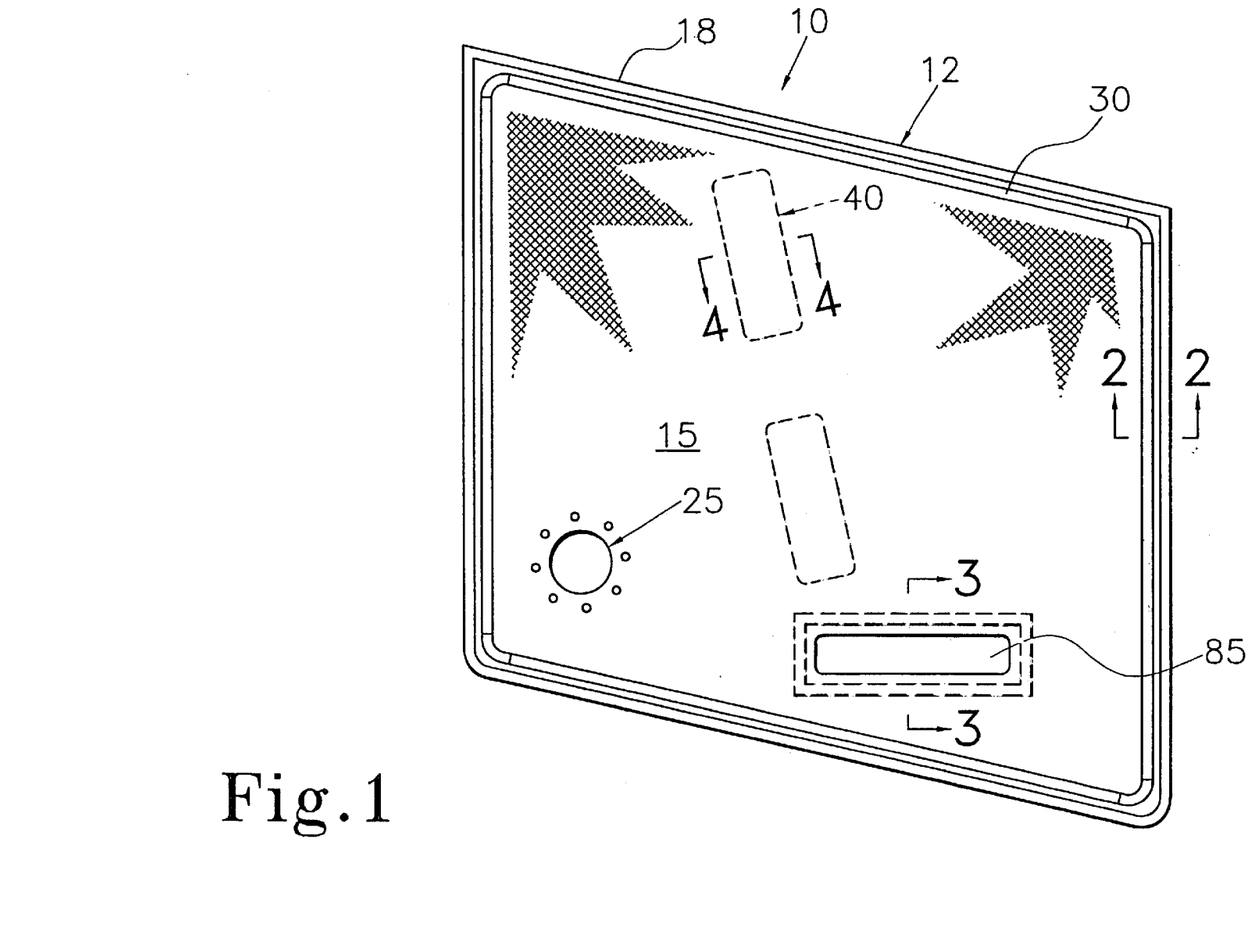
FIG. 1 illustrates a top plan view of the roll-over airbag of the present invention.
Figure 2:
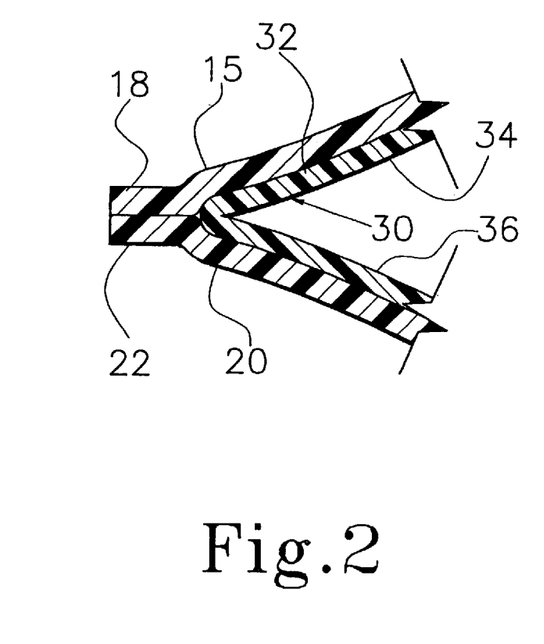
FIG. 2 illustrates a partial cross-sectional view of the roll-over airbag taken at lines 2—2 in FIG. 1.
Figure 3:
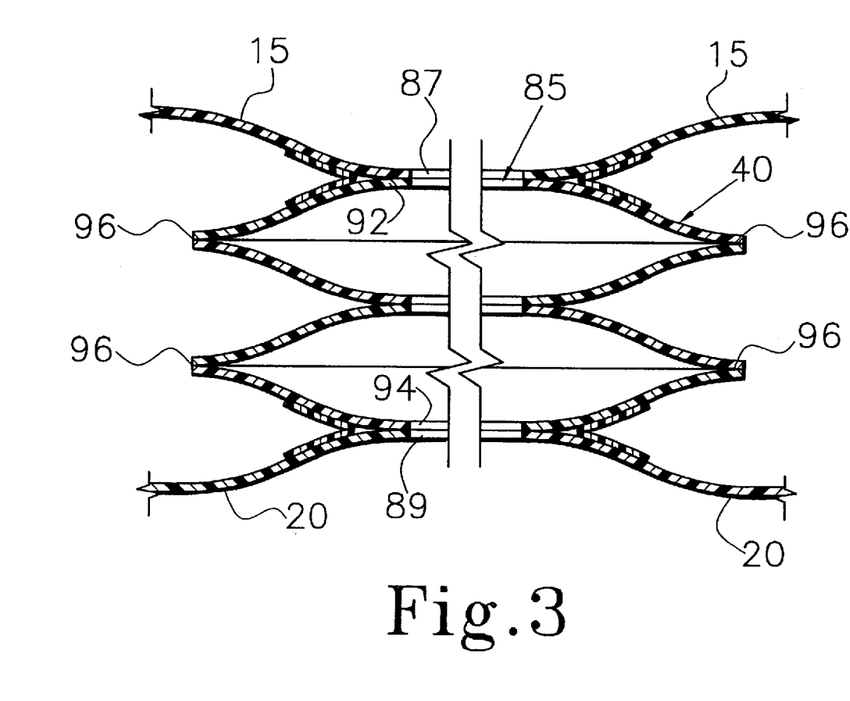
FIG. 3 illustrates a partial cross-sectional view of the roll-over airbag taken at lines 3—3 in FIG. 1.
Figure 4:
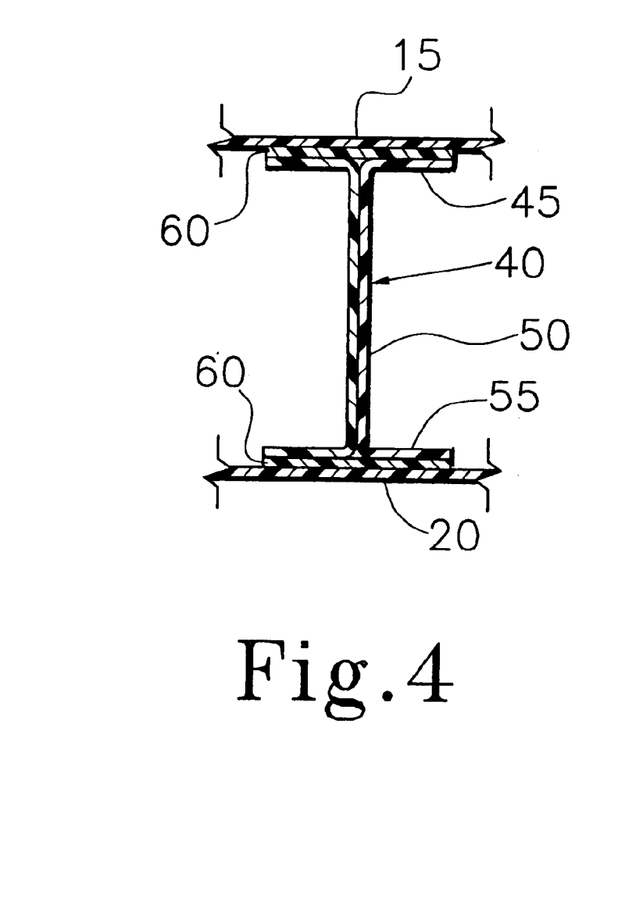
FIG. 4 illustrates a partial cross-sectional view of the roll-over airbag taken at lines 4—4 in FIG. 1.
Figure 6:
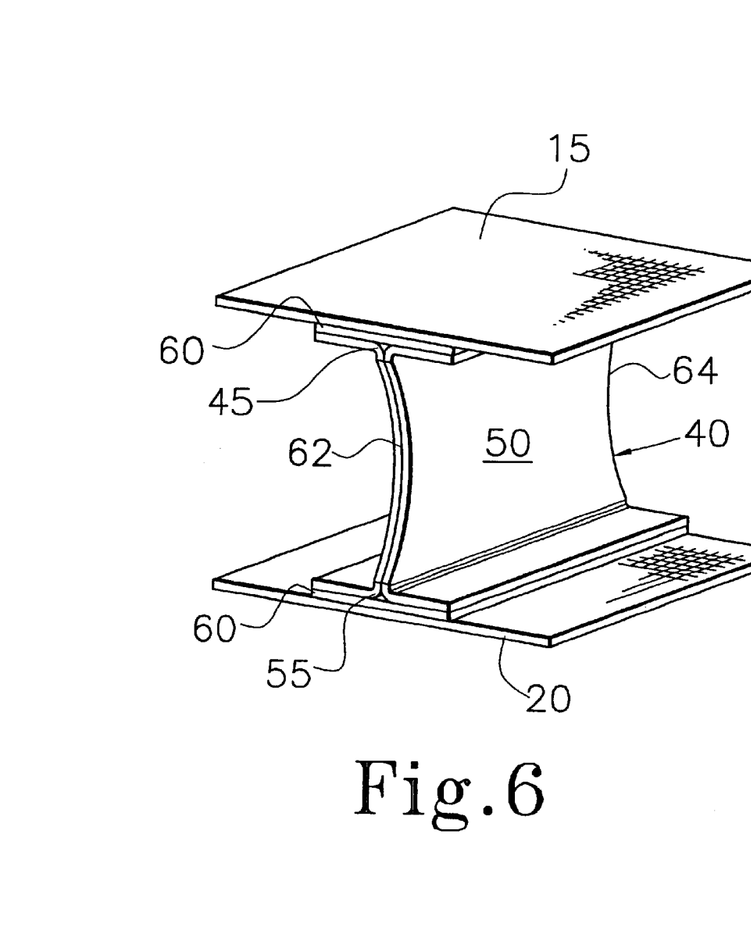
FIG. 6 illustrates a perspective view of the tether illustrated in FIG. 4.
Figure 17:
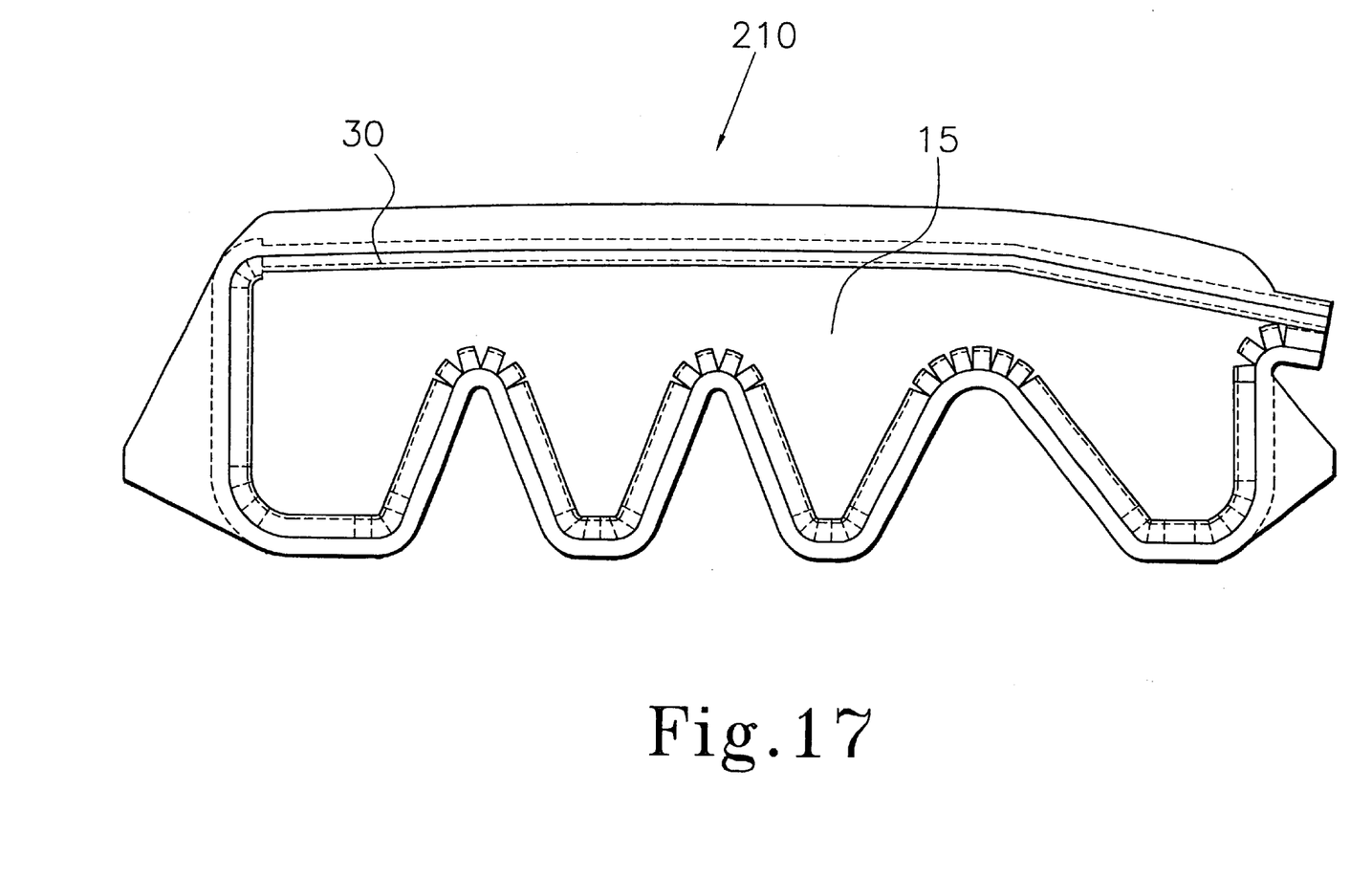
FIG. 17 illustrates a top plan view of a further alternate embodiment roll-over airbag having a reinforced perimeter seal.
Figure 18:
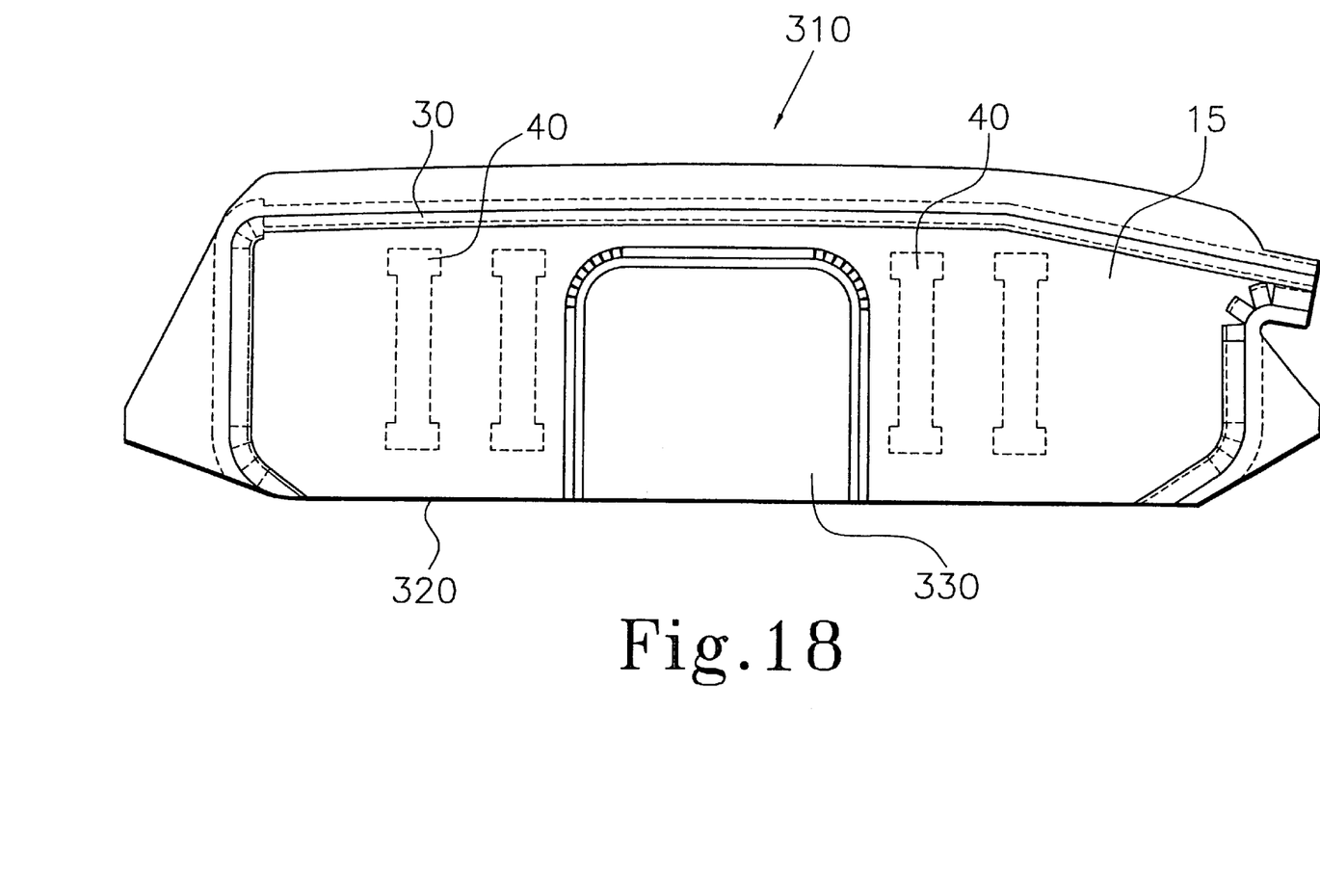
FIG. 18 illustrates top plan view of a still further alternate embodiment roll-over airbag having a reinforced perimeter seal.

It is often desirable to limit the height and/or thickness of the roll-over airbag 10 by limiting the displacement of the upper and lower fabric panels 15 and 20 from one another during expansion of the roll-over airbag 10. This can be accomplished by specifically configuring the shape of the airbag as illustrated in FIG. 17 in which airbag 210 is specifically configured so as to limit the displacement of the upper and lower fabric panels 15 and 20 from one another. Similarly, FIG. 18 illustrates a further alternate embodiment in which airbag 310 is folded along one edge 320 and which includes a centrally located region 330 that is not inflated. This effect can also be achieved by disposing at least one tether member 40 within roll-over airbag 10 for limiting displacement of the upper and lower fabric panels 15 and 20 from one another. In this regard, the tether 40 has a first end 45 bonded to the upper fabric panel 15, a center panel 50, and a second end 55 bonded to the lower fabric panel 20. It will be appreciated by those skilled in the art that the height of the central panel 50 is selected in order to select the height of the airbag 10. Additional factors that determine the ultimate height of the airbag 10 are the number of tethers 40 disposed within airbag 10 and the distance between the tethers 40. As shown in FIGS. 4 and 6, the ends 45 and 55 of the tether 40 can be bonded to a substrate 60 which is in turn bonded to the upper or lower fabric panel 15 or 20 in order to reduce the risk of rupture and to strengthen the bond between the tether 40 and the upper and lower fabric panels 15 and 20. As seen in FIG. 4, the tether 40, in the preferred embodiment is at least a two ply fabric member and has a substantially I-shaped cross-section. Further, to distribute the stress of expansion over a larger surface area of the ends 45 and 55 of the tether 40, the edges 62 and 64 of the center panel 50 have a substantially concave configuration.

Figure 5:
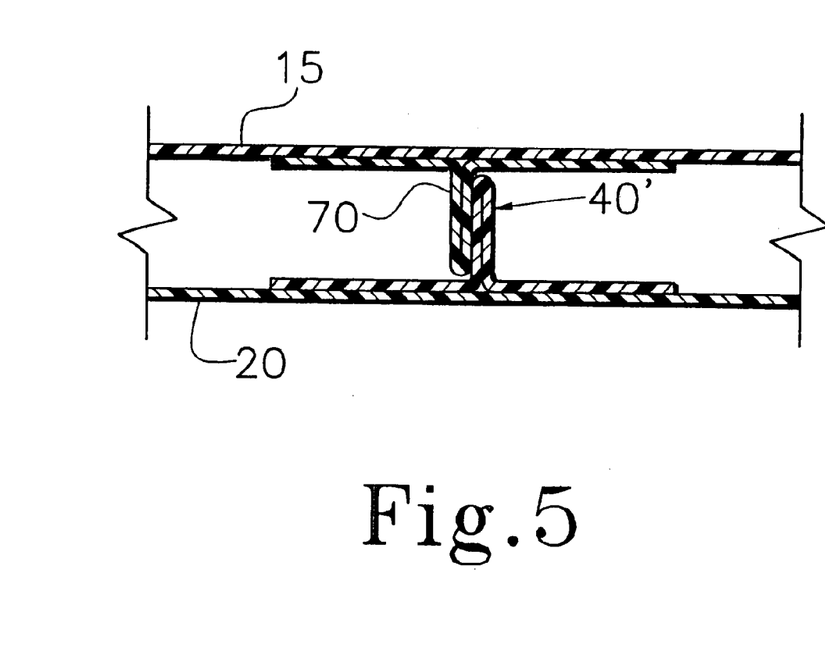
FIG. 5 illustrates a partial cross-sectional view of an alternate embodiment of the tether utilized in the present invention.
Figure 7:
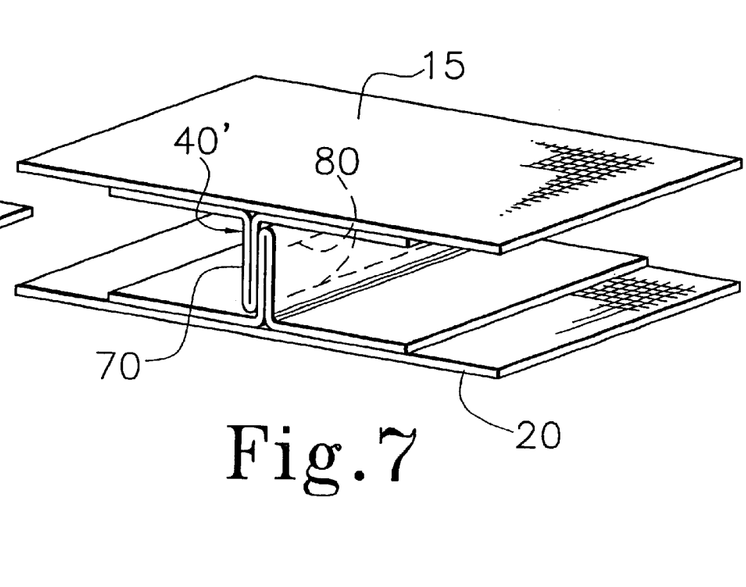
FIG. 7 illustrates a perspective view of the tether illustrated in FIG. 5.

In FIGS. 5 and 7, an alternate embodiment of a tether is illustrated as tether 40'. In this regard, tether 40' is defined by defined by a first folded fabric member 70 which is bonded to the upper fabric panel 15 and a cooperating second folded fabric member 75. The folded portions of first folded fabric member 70 and second folded fabric member 75 are secured to one another by a securement member 80, which in the preferred embodiment is defined by parallel rows of stitching. Further, to distribute the stress of expansion over a larger surface area, the terminal ends of securement member 80, are not coextensive with the edges of the first and second folded fabric members 70 and 75. In this regard, first and second folded fabric members 70 and 75 have a first preselected width and securement member 80 has a second preselected width which is less than the preselected width of first and second folded fabric members 70 and 75.

A further alternate embodiment tether is illustrated in FIGS. 9–12. Tether 40" is a low-profile tether. In this regard, the tether 40" is defined by an upper panel member 140 secured to a lower panel member 145. The upper and lower panels 140 and 145 are secured to one another by means of at least one region of securement 160. In one embodiment, illustrated in FIG. 9a, region of securement 160 is defined by one row, and preferably at least two parallel rows, of stitching 150.

Figures 9A, 9B, 9C, 10, 11:
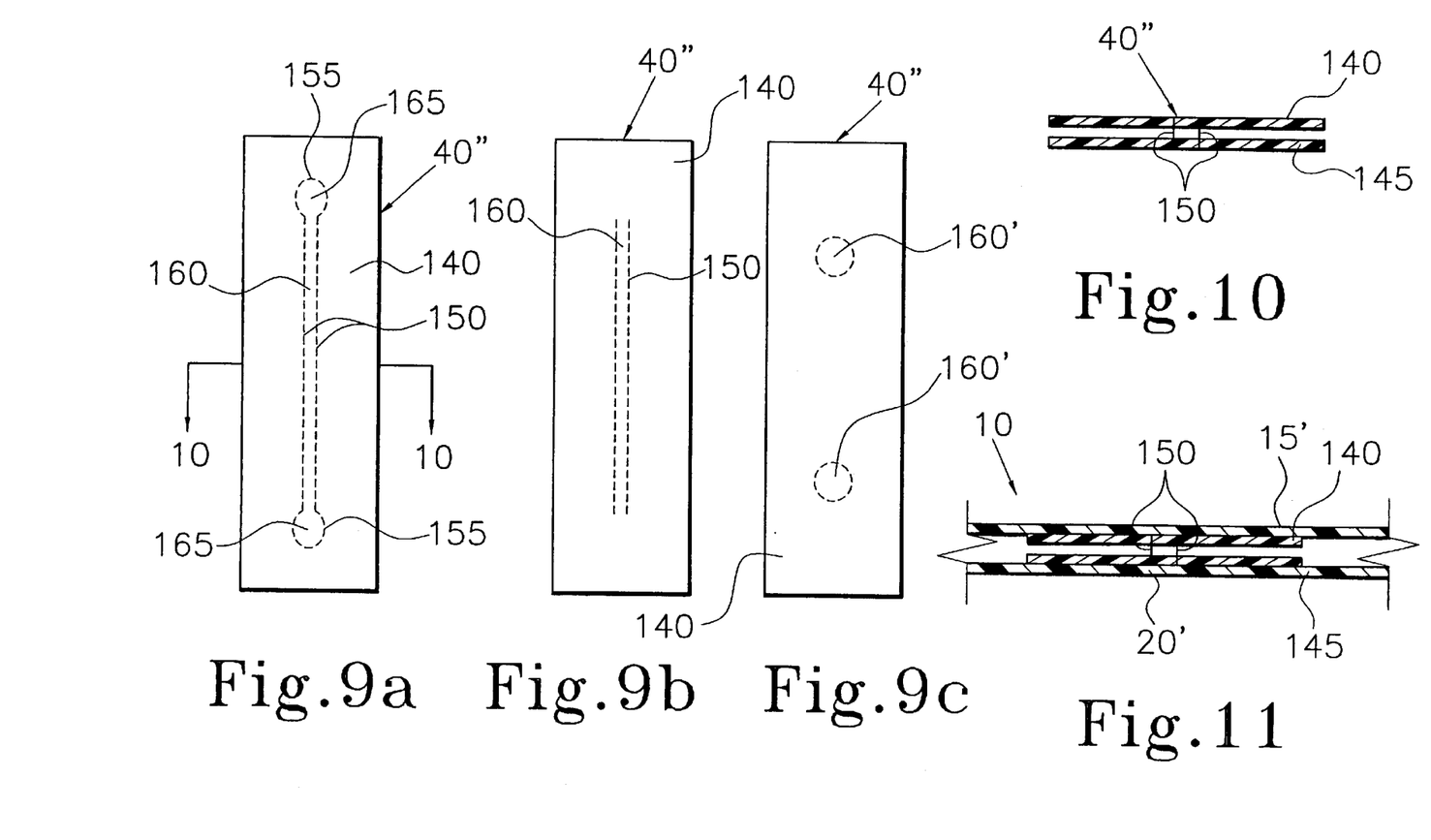

If additional securement of the upper panel member 140 to the lower panel member 145 is desired, for instance, in order to distribute stress at the end of each row of stitching 155 over a broader surface area, the terminal ends can be joined by means of an additional region of securement 165 which is wider than the region of securement 160. In one embodiment, the additional region of securement 165 is defined by a row of stitching 155, which encloses an area having a greater width than the width of the rows of stitching 155, and which is preferably circular or elliptical.

It will be appreciated by those skilled in the art that other means of bonding could be utilized to secure the upper and lower panels 140 and 145 in tether 40", for instance rather than stitching, as described above, the upper and lower panels 140 and 145 could be bonded to one another by an RF weld as described above with regard to the perimetric seal. In another embodiment, illustrated in FIG. 9c, region of securement 160 is defined by a substantially circular region of securement 160'. In this embodiment, it is preferable to include at least two circular regions of securement 160' in spaced relation.

Figure 12:
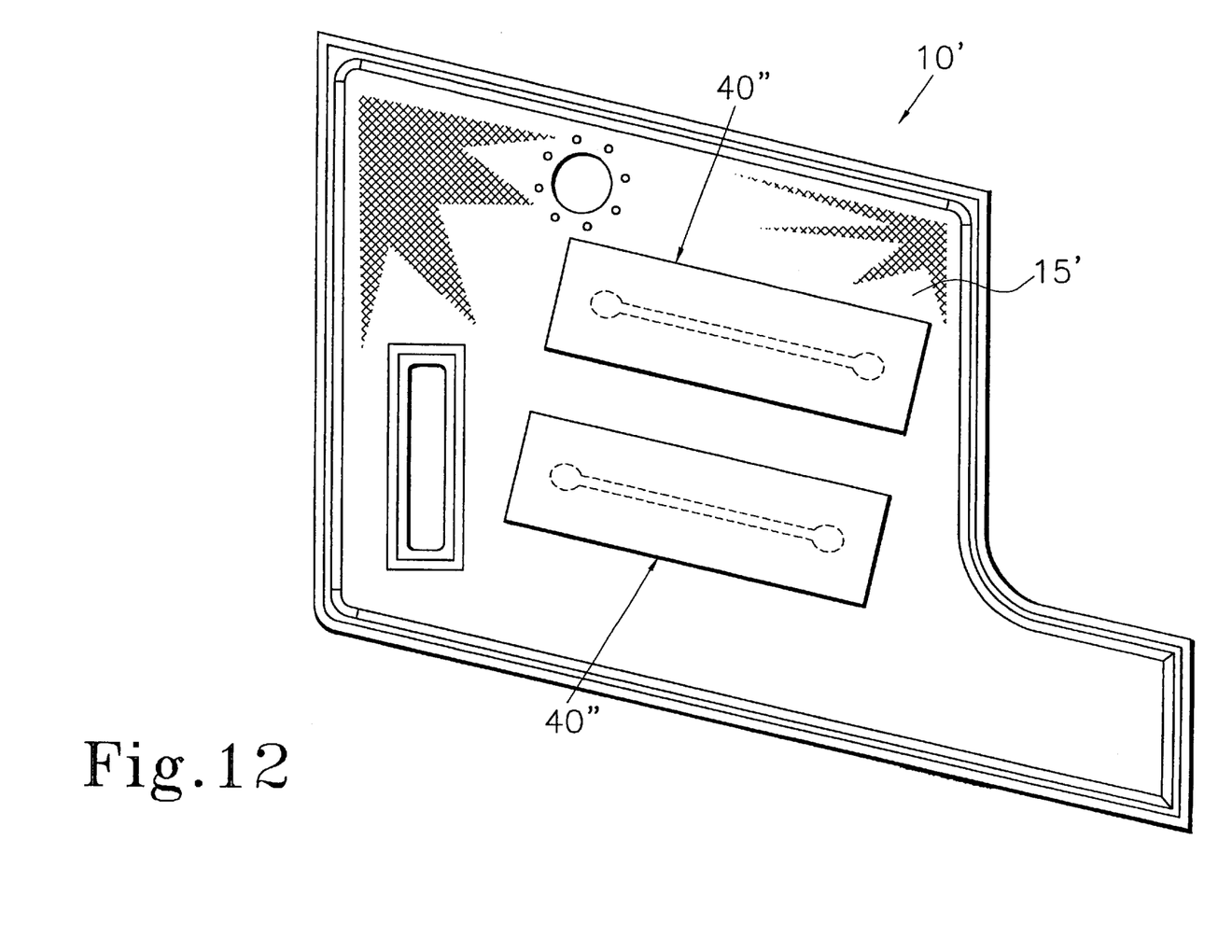
FIG. 12 is a top plan view of the roll-over airbag shown in FIG. 11.

In either embodiment of tether 40", the upper panel member 140 of the tether 40" is then bonded to the upper fabric panel 15 or 15' of either roll-over airbag 10 or 10', respectively, while the lower panel member 150 of the tether 40" is secured to the lower fabric panel 20 or 20" of either airbag 10 or 10',respectively. While preferred methods of providing the region of securement 160, have been described, those skilled in the art will recognize that other methods are feasible. In this regard, there are multiple stitching patterns that could be utilized to provide at least one region of securement 160, and at least one region of securement 160 could be provided by having the upper and lower panels 140 and 145 woven together at selected areas.

Figure 8:
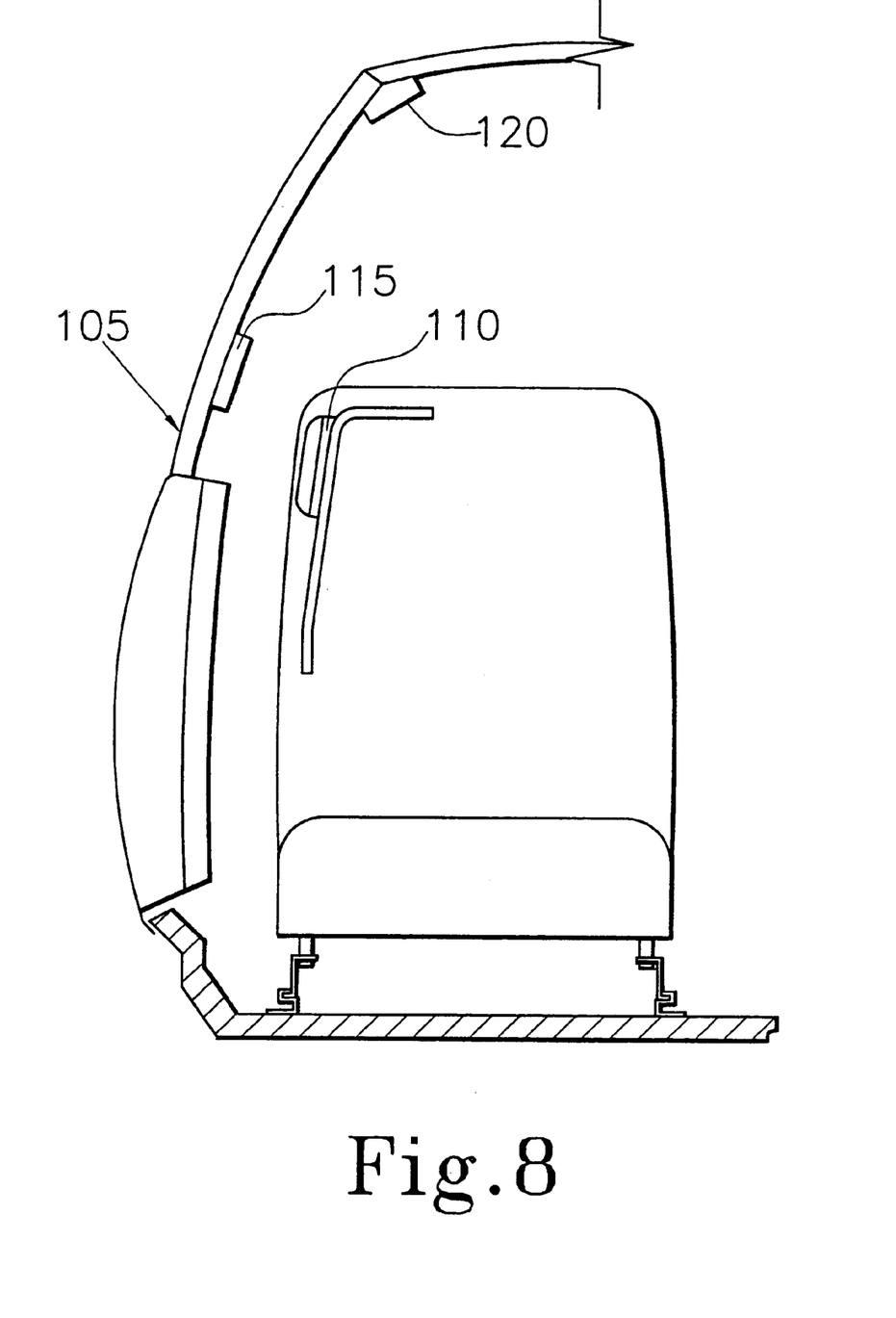
FIG. 8 illustrates a partial schematic view of the placement locations of the roll-over airbag of the present invention.

Those skilled in the art will appreciate that as illustrated in FIG. 8, there are numerous places in vehicle 105 that roll-over airbag 10 can be stored. For instance, roll-over airbag 10 can be stored in the seat back at 110, in the side pillar at 115 or proximate the headliner at 120. Those skilled in the art will recognize that in certain applications, it is desirable to store roll-over airbag 10 at 110 in a manner that permits a seatbelt, (not shown), to pass through the roll-over airbag 10 while folded. In these circumstances where it is desirable to provide for passage of a seat belt through the roll-over airbag 10, a passageway 85 is disposed in the roll-over airbag 10. In this regard, a first opening 87 is provided in the upper fabric panel 15 and a second opening 89 is provided in the lower panel 20 with the first opening 87 and the second opening 89 being in register. In order to maintain the impermeability of the roll-over airbag, a channel member 90 is provided that registers with the first opening 87 and the second opening 89. The channel member 90 has an upper end 92 bonded to the upper fabric panel 15 and a lower end 94 bonded to the lower fabric panel 20, thus providing a through-opening in the roll-over airbag 10. In order to allow the roll-over air bag 10 to expand uniformly in the proximity of the passageway 85, the channel member 90 is expandable. In this regard, expansion of the channel member 90 is accomplished by providing at least one pleat 96 in the channel member 90. The pleats 96 allow the channel member 90 to fold flat when the roll-over airbag 10 is deflated and allows substantially uniform expansion of the roll-over airbag 10 during inflation.

Figure 13:
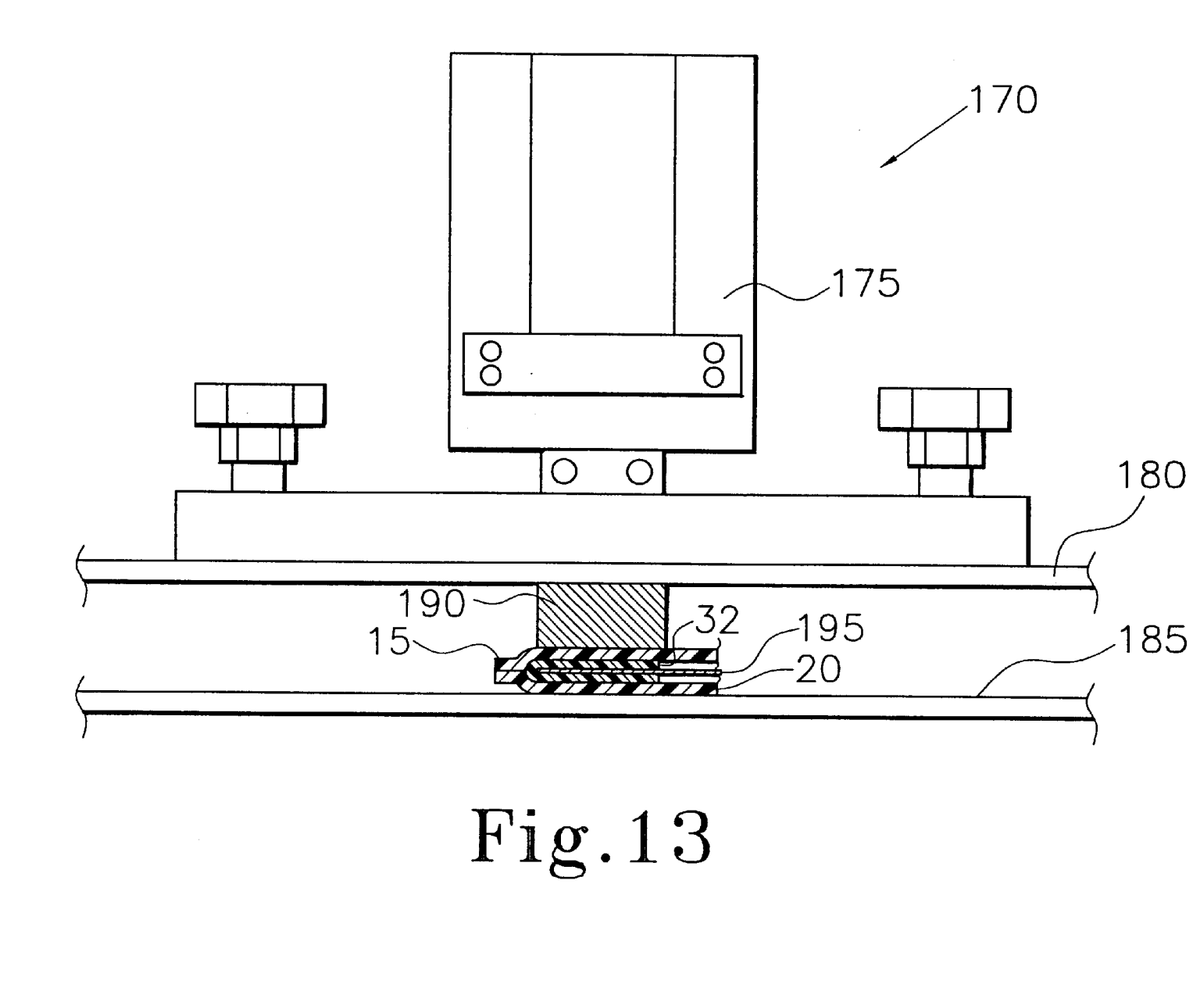
FIG. 13 illustrates a schematic view, not drawn to scale, of the process of RF bonding a flat lap-joint reinforced seam.

As mentioned above, the upper and lower fabric panels 15 and 20 are secured to one another, and the securement member 32 is secured thereto in the manner described above preferably by RF bonding. Referring to FIG. 13, it will be appreciated that a RF bonding machine 170 typically includes a RF generator 175, and RF energy conducting electrodes defining a top plate 180 and a bottom plate 185.

In order to bond a flat seam, the securement member 32 is positioned between the upper and lower fabric panels 15 and 20. A metal form 190 is placed directly above the securement member 32 and between the upper fabric panel 15 and the top plate 180. In this manner, a flat seam is pressed between the metal form 190 and the bottom plate 185.

The metal form 190 has a surface area selected to conform to the region to be bonded. The metal form is also in direct communication with either the top plate 180 or the bottom plate 185 and serves to provide a path of least resistance that concentrates the RF energy on the region to be bonded. It will be appreciated that the perimeter edge of the airbag can be bonded prior to positioning the securement member 32 or the securement member 32 can be positioned with respect to the upper and lower fabric panels 15 and 20, and the perimetric edge and the lap joint bonded sequentially or simultaneously. It will be appreciated that metal form 190 can be a selected metal bar having a geometric surface area that conforms to the surface area of a region to be bonded and the joints are bonded sequentially, or metal form 190 could be a template (not shown) machined to bond all of the joints simultaneously.

In order to prevent the upper and lower portions of the securement member 32 from bonding to each other, a template barrier 195, that is not reactive to RF energy, is disposed between the upper and lower portions of the securement member 32. The template barrier 195 is repositioned as each section is bonded and is removed through an opening, such as inflator port 25. Alternatively, the template barrier 195 can be left in the sealed airbag. As an alternative method, the securement member 32 can be formed from a material that prevents the bonding agent from bleeding through the fabric, in other words, the securement member 32 can be formed of a material impervious to the bonding agent and non-reactive to radio frequency energy, in this manner the bonding agent is coated only on a side of the securement member 32 that is in contact with the first and second fabric panels, or can be coated on the non-bonded side with a thin film barrier such as Mylar. It will be appreciated by those skilled in the art that this method is useful for sealing each of the reinforced joints discussed herein. The foregoing method allows the reinforced joint to be sealed in a flat configuration in a manner that prevents wrinkling of the joint face.

From the foregoing description, it will be recognized by those skilled in the art that a roll-over airbag offering advantages over the prior art has been provided. Specifically, the roll-over airbag of the present invention provides a roll-over airbag that has perimetrically sealed edges that are reinforced with a sealed lap joint that renders the perimetrically sealed edges capable of sustaining pressure for an extended period of time. Further, the present invention provides a roll-over airbag that is either configured so as to limit the displacement of the sides from one another during expansion of the airbag or includes at least one internal, reinforced tether for limiting the displacement of the sides from one another during expansion of the airbag. The present invention further provides a novel method for providing a sealed flat reinforcing lap joint along the sealed edges.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A method of producing a flat joint seam in a roll-over airbag, in which the joint seam of the roll-over airbag is reinforced with a lap joint, said method comprising the steps;

overlaying a first fabric panel having a perimeter of a pre-selected length on a second fabric panel having a perimeter of said pre-selected length, wherein said first and second fabric panel are coated with a bonding agent reactive to RF energy;

bonding said perimeter of said first fabric panel to said perimeter of said second fabric panel using radio frequency energy by pressing a region of said perimeter between a metal form having a surface area selected to conform to said region to be bonded and a bottom plate, wherein said metal form and said bottom plate are in radio frequency conductive communication with a radio frequency generator;

disposing at least one securement member proximate said perimeter, said at least one securement member having said bonding agent coated on at least one side, wherein said at least one securement member includes an upper portion and a lower portion, such that said upper portion adjoins said first fabric panel and said lower portion adjoins said second fabric panel, wherein said at least one securement member is folded such that said upper portion is in contact with said lower portion;

disposing a barrier between said upper portion and said lower portion, wherein said barrier is not reactive to RF energy; and bonding said upper portion to said first fabric panel and said lower portion to said second fabric panel thereby forming a lap joint reinforced seal using radio frequency energy by pressing a region of said lap joint reinforced seal between said metal form and said bottom plate, whereby said barrier prevents said bonding agent from bleeding through said at least one securement member thereby preventing said upper portion from bonding to said lower portion, wherein said step of disposing said barrier is achieved by constructing said at least one securement member of a material impervious to said bonding agent and non-reactive to radio frequency energy, wherein said bonding agent is coated only on a side of said at least one securement member in contact with said first fabric panel and said second fabric panel.

\* \* \* \* \*